(United States Patent Office — 3,240,781 — Patented Mar. 15, 1966)

3,240,781
1-LOWER ALKYL-4-ANILINOPHTHALAZINES
Alan F. Turner, Wheathampstead, Herts, and David G. Parsons, Hertford, Herts, England, assignors to Vantorex Limited, Loughborough, England, a British company
No Drawing. Filed Jan. 6, 1965, Ser. No. 423,838
3 Claims. (Cl. 260—250)

This invention relates to compositions of matter classified in the art of chemistry as substituted phthalazines.

The invention sought to be patented is described as residing in the concept of a 1-lower alkyl-4-anilinophthalazine and its hereinafter described equivalents.

As used throughout the application, the term "lower alkyl" embraces both straight and branched chain alkyl groups having 1 to 6 carbon atoms, such as methyl, ethyl, n-propyl, isopropyl, n-butyl, tert-butyl, n-amyl, n-hexyl, 2-ethylbutyl and the like; the term "lower alkoxy" embraces straight and branched chain alkoxy groups having 1 to 6 carbon atoms, such as methoxy, ethoxy, n-propoxy, isopropoxy, n-butoxy, tert-butoxy, n-amyloxy, n-hexyloxy, 2-ethylbutoxy and the like; and the term halo includes chloro, bromo, fluoro and iodo.

The tangible embodiments of this invention possess the inherent general physical characteristics of being solid crystalline materials. Elemental analysis and infrared spectral analysis data, taken together with the aforementioned physical characteristics, nature of the starting materials and mode of synthesis, positively confirm the structure of the compounds sought to be patented.

The tangible embodiments of this invention also possess the inherent applied use characteristics of having significant pharmacological activity as antipyretic, antiinflammatory, analgesic and central nervous system depressant agents as determined by recognized and accepted pharmacological test procedures.

The manner and process of making and using the invention will now be generally described so as to enable a person skilled in the art of chemistry to make and use the same as follows:

The starting materials for the preparation of the tangible embodiments of this invention are 1-lower alkyl-4-halophthalazines. There are known compounds that are readily prepared according to the method described by Gabriel and Neumann (Ber. 26: 521 (1893)), by treatment of the correspondingly lower alkyl substituted phthalazone with a halogenating agent such as, for example, a phosphorus oxyhalide.

Conversion of the 1-lower alkyl-4-halophthalazine starting materials to the tangible embodiments of this invention is illustrated by the following reaction sequence showing the preparation of the specific final product 1-(n-butyl)-4-anilinophthalazine:

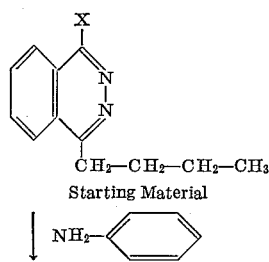

Starting Material

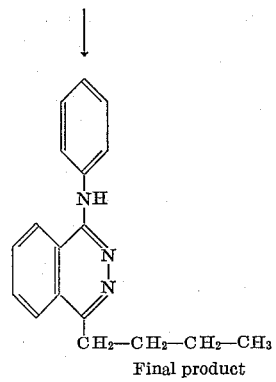

Final product wherein X is halo.

According to the reaction sequence depicted above, the 1-lower alkyl-4-halophthalazine starting material or its hereinafter described equivalent and aniline or its equivalents bearing lower alkyl or lower alkoxy ring substitution are heated at reflux temperature in the presence of an inert organic solvent such as, for example, ethanol. The crystalline product is then obtained from the reaction mixture by conventional techniques of filtration and crystallization.

Starting materials wherein the benzene ring of the phthalazine nucleus bears one or more lower alkyl or lower alkoxy groups are prepared from similarly substituted phthalazones by the same techniques described in the Gabriel and Neumann paper referred to hereinabove and are the full equivalents of the specific starting materials depicted in the above described reaction with aniline or its above described equivalents, thereby resulting in the preparation of final products having lower alkyl or lower alkoxy substituents on the benzene ring at the same positions as in the starting material. Such products have the same utility as the specific products depicted in the above reaction sequence and are included within the scope of the tangible embodiments of the invention.

The tangible embodiments of this invention in free base form can, if desired, be converted into their non-toxic pharmaceutically acceptable mineral acid-addition salts. Salts which may be formed comprise, for example, salts such as the hydrochloride, hydrobromide, hydroiodide, sulfate, phosphate or the like. Pharmaceutically, the salt will not be substantially more toxic than the compound itself, and to be acceptable, it should be able to be incorporated into conventional liquid or solid pharmaceutical media. Such pharmaceutically useful mineral acid-addition salts are the full equivalents of the bases from which they are formed and are included within the scope of this invention.

The tangible embodiments of this invention, either as free bases or in the form of a non-toxic pharmaceutically acceptable mineral acid-addition salt, can be combined with conventional pharmaceutical diluents and carriers to form such dosage forms as tablets, suspensions, solutions, suppositories and the like.

The best mode contemplated by the inventor for carrying out this invention will now be set forth as follows:

EXAMPLE 1

*4-anilino-1-n-butylphthalazine*

4-chloro-1-n-butylphthalazine (6.0 g., 0.027 mole) and aniline (4.0 g., 0.043 mole) are heated at reflux temperature in ethanol (25 ml.) for 90 minutes. Solvent is removed in vacuo and the residue taken up in chloroform. The solution is washed with sodium bicarbonate, then water, dried and evaporated giving a brown oil (4.9 g.) which solidifies on cooling. Recrystallization from ethanol yields 3.6 g. (48%) fine pale yellow needles, 161°–162° C.

Analysis.—Calculated for $C_{18}H_{19}N_3$: C, 78.0%; H, 7.0%; N, 15.1%. Found: C, 78.3%; H, 7.1%; N, 15.0%.

EXAMPLE 2

*4-N-(p-toluidino)-1-n-butylphthalazine*

4-chloro-1-butylphthalazine (5.0 g., 0.023 mole) is converted into 4-N-p-toluidino-1-n-butylphthalazine by treatment with p-toluidine (2.4 g., 0.022 mole) according to the procedure set forth in Example 1. Recrystallization from ethanol yields 5.7 g. (87%) of felted needles, M.P. 152°–154° C.

Analysis.—Calculated for $C_{19}H_{21}N_3$: C, 78.3%; H, 7.26%; N, 14.42%. Found: C. 78.40%; H, 7.04%; N, 14.50%.

The subject matter which the applicants regard as their invention is particularly pointed out and distinctly claimed as follows.

We claim:
1. 1-lower alkyl-4-anilinophthalazine.
2. 1-(n-butyl)-4-anilinophthalazine.
3. 1-(n-butyl)-4-N-(p-toluidino)phthalazine.

No references cited.

IRVING MARCUS, *Primary Examiner.*